United States Patent [19]

Farrar et al.

[11] Patent Number: 4,880,858
[45] Date of Patent: * Nov. 14, 1989

[54] WATER ABSORBING POLYMERS

[75] Inventors: David Farrar, Bradford; Peter Flesher, Bingley; Malcolm Skinner; John Clarke, both of Bradford; David Marshall, North Mirfield; Malcolm Hawe, Huddersfield, all of United Kingdom

[73] Assignee: Allied Colloids Limited, Bradford, England

[*] Notice: The portion of the term of this patent subsequent to Sep. 1, 2004 has been disclaimed.

[21] Appl. No.: 91,551

[22] Filed: Aug. 31, 1987

Related U.S. Application Data

[63] Continuation-in-part of Ser. No. 835,602, Mar. 3, 1986, Pat. No. 4,690,971.

[30] Foreign Application Priority Data

| Mar. 5, 1985 | [GB] | United Kingdom | 8505632 |
| Dec. 13, 1985 | [GB] | United Kingdom | 8530784 |
| Jan. 30, 1987 | [GB] | United Kingdom | 8702052 |
| Jul. 20, 1987 | [GB] | United Kingdom | 8717093 |
| Aug. 13, 1987 | [GB] | United Kingdom | 8719215 |
| Aug. 13, 1987 | [GB] | United Kingdom | 8719216 |

[51] Int. Cl.$^4$ ............................. C08J 0/00
[52] U.S. Cl. ............................. 524/60; 524/59; 524/69
[58] Field of Search ............................. 524/60, 59, 69

[56] References Cited

U.S. PATENT DOCUMENTS

| 3,562,291 | 2/1971 | Lutzmann et al. | 260/32.6 |
| 3,935,099 | 1/1976 | Weaver et al. | 252/312 X |
| 3,973,355 | 8/1976 | McKenzie | 47/37 |
| 4,059,552 | 11/1977 | Zweigle et al. | 526/81 X |
| 4,345,046 | 8/1982 | Ejk et al. | 524/223 |
| 4,370,429 | 1/1983 | Clarke et al. | 524/60 |
| 4,470,827 | 9/1984 | Kekish et al. | 252/70 X |
| 4,542,176 | 9/1985 | Graham | 524/543 |
| 4,690,971 | 3/1986 | Flesher et al. | 524/555 |
| 4,740,329 | 4/1988 | Wrench | 252/312 |

FOREIGN PATENT DOCUMENTS

| 0671463 | 10/1963 | Canada | 524/60 |
| 0072213 | 2/1983 | European Pat. Off. | |
| 0072214 | 2/1983 | European Pat. Off. | |
| 0101253 | 2/1984 | European Pat. Off. | |
| 0105237 | 4/1984 | European Pat. Off. | |
| 0258295 | 12/1985 | Japan | 524/60 |
| WO86/06000 | 10/1986 | PCT Int'l Appl. | |
| 915589 | 1/1963 | United Kingdom | |
| 1395543 | 5/1975 | United Kingdom | |
| 1573201 | 8/1980 | United Kingdom | |
| 2122218A | 1/1984 | United Kingdom | |
| 2148938A | 6/1985 | United Kingdom | |

Primary Examiner—Joseph L. Schofer
Assistant Examiner—J. M. Reddick
Attorney, Agent, or Firm—Robbins & Laramie

[57] ABSTRACT

A wet filter cake of coal fines or other inorganic particulate material is converted to a crumbly mass by blending with water absorbent polymer particles.

17 Claims, No Drawings

WATER ABSORBING POLYMERS

This application is a continuation-in-part of application Ser. No. 835,602 filed 3rd March 1986, now U.S. Pat. No. 4,690,971.

This invention relates primarily to the mining of coal and to the recovery and use of the fines or tailings that are associated with coal mining, but also relates to the handling of other wet particulate materials.

Relatively large volumes of coal fines are formed during the mining of coal and the recovery and transportation of mined coal. They have a size mainly below 1 mm, and often considerably less. Some of the fines are separated from the coarse coal at the point of mining but others are washed from the coarse coal after mining. Irrespective of how they are separated, the coal fines cause a serious problem at a coal mine (underground or open cast). Normally they are put into the form of a mobile slurry or a froth flotation concentrate and are then converted into a filter cake by filtration, e.g., vacuum filtration by disc or drum filters. The filtration is performed to achieve the lowest possible water content but the final filter cake, when taken off the filters and subsequently handled, is always found to be a very sticky material that is highly viscous or is semi-solid. This very thick or semi-solid material is formed of wet coal fines and typically has a water content of around 30%.

Its texture is such that at present it is difficult to use any or all of it and vast volumes of the filter cake are dumped. Attempts to convert it into bonded pellets or bricks have not been very successful and attempts at blending the filter cake with small coal to make a power station feed also are not very successful, primarily because the amount of filter cake normally has to be kept very low and even then handling is difficult. There is therefore an urgent need to convert the wet filter cake to a state in which it can be much more easily handled and used.

This problem has been outstanding for very many years and yet no solution has been found to the problem until the present invention.

In GB 2,122,218 a water absorbing polyelectrolyte is blended with moist fine particulate material such as fine coal. It is stated that this is done to improve handlability and in all the detailed description this is achieved by pelletising the fine coal using the electrolyte in combination with a binder. Thus the moist coal is converted direct from its moist sticky state to bonded pellets and is never put into a friable particulate state. Also, as mentioned above, the bonded pellets have proved unsatisfactory.

There have been numerous disclosures in the literature for many years of various uses of various water absorbing polymers, and reference is made to disclosures such as U.S. Pat. Nos. 3,935,099, 3,973,355 and 4,542,176 and GB 1,573,201. Also a dispersion of very small cross linked synthetic polymer particles is described, as a thickener for aqueous media, in U.S. Pat. No. 4,059,552. None of these disclosures are relevant to the problem of finding a way of handling and subsequently using a coal fines wet filter cake, nor of handling or subsequently using other sticky, wet, particulate masses of similar characteristics.

We have now found that, in preference to trying to bond the filter cake direct into the form of pellets or other bricks, a much more effective way of handling the filter cake is to convert it to a crumbly mass of substantially dry coal fines, since it is then easy to handle or use the crumbly mass in any convenient manner.

In particular, in the invention, a wet filter cake or other wet sticky mass of coal fines is mixed with water absorbing polymer particles and is thereby converted to a crumbly mass of substantially dry coal fines.

A preferred process according to the invention comprises mixing a wet sticky mass of coal fines with polymer particles that are non-film forming and non-sticky when wetted by the water in the wet mass and that are of water absorbing polymer, thereby forming a crumbly mixture of substantially dry coal fines and substantially non-sticky swollen polymer particles.

The polymer must not become sufficiently sticky during the process to cause aggregation of the coal fines. The polymer can be soluble in water but preferably it is insoluble. If, as is preferred, the polymer is a synthetic polymer then the polymerisation conditions and the monomers are preferably such that the content of high molecular weight linear, or soluble, polymer is sufficiently low that during the process the particles do not become sticky.

The polymer may be natural or modified natural polymer such as a polymer of starch or starch acrylonitrile graft copolymer, but preferably it is a synthetic polymer. It may be formed from a monomer blend such that the polymer, in linear form, is swellable but insoluble, for instance as a result of including hydrophobic monomer in the monomer blend. Such polymers can, for instance, be made by oil-in-water emulsion polymerisation. For instance they may be made at a pH at which they are relatively non-swellable and insoluble and the pH may then be adjusted, for use, to a value at which the particles are swellable and absorbent and that is the pH of the wet particulate mass.

Generally however the polymer is made from water soluble monomer or monomer blend. Suitable monomers are generally monoethylenically unsaturated monomers but cross linking agent is preferably included in order to convert the resultant polymer to water insoluble but water swellable form. The cross linking agent can be reacted into the polymer after polymerisation but preferably is present during polymerisation. Generally it is a di- or other poly-ethylenically unsaturated monomer such as methylene bis acrylamide or any of the other ethylenically unsaturated cross linking agents that are suitable for cross linking absorbent polymer particles. Instead of or in addition to relying on a convalent cross linking agent of this type, cross linking can also be through pendant groups in known manner. For instance it can be by polyvalent metal ions.

When the polymer particles are of cross linked, water swellable but insoluble, synthetic polymer, they may be anionic, non-ionic or cationic and will then be formed from appropriate monomer or monomer blend. The monomers are generally acrylic.

Suitable anionic monomers are ethylenically unsaturated carboxylic or sulphonic monomers such as (meth) acrylic acid, allyl sulphonate or 2-acrylamido methyl propane sulphonic acid. Anionic monomers are generally present as a water soluble salt, usually a sodium salt.

Suitable non-ionic monomers are (meth) acrylamide and (meth) acrylic esters.

Suitable cationic monomers are dialkyl amono alkyl (meth)-acrylate or -acrylamide as free base, acid salt or, preferably, quaternary salt and diallyl dimethyl ammonium chloride. Cationic monomers are generally used as a blend with acrylamide. Anionic monomers may be present as homopolymer or as copolymers of anionic monomer with, preferably, acrylamide.

The polymers can be as described in EP 213799, or cationic versions thereof.

One class of preferred polymers for use in the invention are cross linked polymers of 5 to 100 mole % acrylic acid (as free acid or salt) with 0 to 95 mole % acrylamide and optionally 0 to 50 mole % other non-ionic or anionic monomer. The acrylic acid is preferably present wholly or mainly, e.g., at least 70 or 80% by weight, as sodium acrylate. One class of these polymers are substantial homopolymers, in which the amount of acrylamide is not more than 20% and is preferably substantially zero. Another preferred class of these polymers are copolymers in which the amount of acrylic acid (as free acid or salt) is typically from 20 to 75% by weight, with the balance being acrylamide. It is generally preferred for least 40% by weight of the monomers for the anionic polymer to be sodium acrylate. Preferred polymers are cross linked polymers of 40 to 60% by weight sodium acrylate with 60 to 40% by weight acrylamide when used as dispersions in water immiscible liquid.

The degree of swellability and absorption is controlled, in part, by the extent of cross linking and the amount of cross linking agent is usually below 500 ppm, often below 300 ppm. It is usually at least 10 ppm or 20 ppm and preferably at least 50 ppm. Best results are often achieved at around 100 or 200 ppm. These amounts are the amounts by weight of monomer of methylene bis acrylamide and equivalent amounts of other cross linking agents may be used.

The degree of cross linking, and the polymer type, should be such that the gel capacity of the polymer (grams deionised water absorbed per gram polymer) is at least 25, generally at least 100 and preferably at least 200 typically up to 500 or even 700 or higher. For instance if the diameter of the dry polymer particles is D, the diameter of the swollen polymer particles is normally at least 2D and often at least 2.5D, for instance up to 5D or even 10D.

In some instances it is desirable for the polymer particles to have a surface layer that is less swellable than the inner parts of the particles. The desired reduced swellability of the surface layer is preferably obtained by cross linking the surface layer. This reduces the content of linear polymer at any position where it might cause stickiness and has the advantage of promoting uptake of water and of preventing aggregation of the polymer particles. The desired cross linking can be achieved by methods such as those described in U.S. Pat. Nos. 3,114,651, 3,251,814, 4,043,8952, 4,093,013 and 4,090,013, JP 1983/42602 and EP 227305. Other ways of treating the surface are by applying a coating of a counter ionic polymer (e.g., poly diallyl dimethyl ammonium chloride or other cationic polymer when the swellable polymer is anionic) or by applying sodium aluminate or other aluminate.

In one process according to the invention the particles are applied as a dispersion in water immiscible liquid.

The dry size of the polymer particles can be relatively large, e.g., up to 200, 500 or even 1,000 $\mu$m, but preferably is below about 100 $\mu$m, often below about 50 $\mu$m. When fastest results are required, preferably at least 90% of the particles are below about 20 $\mu$m or 30 $\mu$m, and most preferably below 10 $\mu$m. Fastest results are generally achieved with at least 90%, preferably 99%, by weight being below 3 $\mu$m, e.g., in the range 0.03 to 2 $\mu$m. Often however adequate results are obtained in a cost effective manner, albeit more slowly, if the particle are 90% between 5 50 $\mu$m, e.g., about 5 to 30 $\mu$m.

Whereas most industrial processes that use dispersions of polymer in water-immiscible liquid require that the amount of polymer should be as high as possible, in the invention we find that best results are achieved when the amount of polymer is relatively low. Thus although the dry weight of polymer can be up to, for instance, 50 or 60% by weight of the dispersion, the dry weight of polymer in the dispersion is preferably below 45% by weight and preferably below 40%. Generally it is at least 15%, preferably at least 20%. Concentrations of 30 to 40% polymer dry weight based on total dispersion are often best when the polymer particles are wet and 20 to 30% when the polymer particles are dry.

The water-immiscible liquid may be any organic liquid in which the polymer particles can be adequately dispersed and that will not interfere with the process and so in practice needs to be substantially water immiscible. It can be, for instance, a vegetable doil but is preferably a hydrocarbon or halogenated hydrocarbon liquid. It may be selected from any of the liquids conventionally used in reverse phase dispersions. For instance it can be kerosene or diesel oil or other mineral oil.

The dispersion can be formed at the point of use, with the polymer particles being dispersed into the water-immiscible liquid and the mixture then being applied substantially immediately to the wet particulate mass. Preferably however the dispersion is preformed, in which event it needs to be substantially stable against settlement.

One form of dispersion is a suspension obtained by dispersing preformed dry polymer particles into water-immiscible liquid in the presence of a dispersion stabiliser. The preformed polymer particles will generally include particles having a dry size of at least 50 $\mu$m but preferably are mainly in the range 10 to 50 $\mu$m. Typically they are fines obtained from the comminution of polymer gel, or they may be fines from a reverse phase bead polymerisation process.

Preferably however the dispersion is a reverse phase dispersion made by reverse phase polymerisation of aqueous monomer or monomer blend in water-immiscible liquid. The reverse phase polymerisation is preferably conducted as a reverse phase suspension polymerisation. Formation of an initial dispersion of monomer particles can be facilitated by the incorporation of a small amount of water-in-oil emulsifying agent. Often amphipathic stabiliser is included, in known manner, especially when the dispersion is subsequently azeotroped. Depending upon the degree of agitation when forming the initial dispersion of aqueous monomer in the non-aqueous liquid, and depending upon the amount and type of stabiliser and emulsifier, if present, the dry particle size of the final dispersion can be controlled and typically has a maximum size of 1 $\mu$m or up to 2 or 3 $\mu$m or 10 $\mu$m at the most. The product of the reverse phase polymerisation can be described as an emulsion. It may be dried, e.g., by azeotroping to reduce the water content, typically to below 15% by weight of the polymer. The product is then a substantially dry dispersion.

When the dispersion is made by dispersing preformed polymer into oil, the amount of stabilizer in the oil is typically from 1 to 15%, often 3 to 10%, based on the dry weight of polymer but when the dispersion is made by reverse phase polymerisation the amount of amphipathic stabiliser (if present) is generally in the range 0.2 or 0.5 to 10%, and generally below 5%, based on the weight of polymer. The amount of water-in-oil emulsifier is preferably from 0.2 to 3%, based on weight of monomer.

In normal processes in which a reverse phase dispersion is mixed into water, it is conventional to conduct the mixing in the presence of an oil-in-water emulsifier so as to promote distribution of the dispersion, and dissolution of the dispersed polymer, into the water. For instance, it is common to add the emulsifier to the polymer dispersion before blending with the water. Because of the apparent need to achieve rapid distribution of the polymer throughout the wet particulate mass, we therefore expected it to be necessary to use such as emulsifier. We have surprisingly found, in the invention, that better results are achieved in the absence of this emulsifier than when the conventional addition is made. This suggests, surprisingly, that is is desirable to retard the rate at which the polymer particles are made available to, and can take up water from, the wet particulate mass.

Since one purpose of the polymer particles is to absorb water from the wet particulate mass it would be expected that the particles should be as dry as possible at the start of the process. However we have surprisingly found that improve results are achieved when, at the time of addition to the wet particulate mass, the polymer particles in the dispersion contain a substantial amount of water, usually at least 30% based on the dry weight of polymer. Usually the amount is below 150% and typically is in the range 60 to 120%, preferably 80 to 100%, based on the dry weight of polymer.

Preferred compositions comprise 20 and 50% by weight of each of the polymer (dry weight), water-immiscible liquid and water. The amount of each of the polymer and the water immiscible liquid is preferably 25 to 45%, most preferably 30 to 40% by weight. The amount of the water is preferably from 20 to 40%, most preferably 25 to 35%. Particularly preferred compositions comprise 30 to 40% by weight polymer, 30 to 40% by weight water immiscible liquid and 25 to 35% by weight water, with the amount of water generally being less than the weight of polymer.

Compositions containing such amounts of water tend to be unstable if the dry particle size is significantly above 10 $\mu$m and so the preferred compositions that contain water have a particle size lower than this, preferably below 3 $\mu$m. Preferably they are made by reverse phase polymerisation. Accordingly they can be made by reverse phase polymerisation (usually by reverse phase suspension polymerisation) to form an emulsion of aqueous polymer gel particles dispersed in the water immiscible liquid, and then the emulsion can be used as such without further drying and without the addition of oil-in-water activator. However for some purposes it appears best to dry the emulsion by azeotroping in conventional manner and then to add water back into the dispersion.

It is very surprising that better results are achieved using wet polymer particles than dry, both because it would be expected that dry particles would be more effective absorbents and because it has occasionally been suggested in the literature that wet particles initiate absorption quicker than dry particles. However the improved results obtainable in the absence of oil-in-water emulsifier indicate that accelerated absorption is not desirable.

Applying the polymer particles as a dispersion in hydrophobic liquid permits very easy mixing and, since the polymer particles can be small, permits rapid achievement of the desired results, relative to what may be obtained with larger particles.

In another preferred process according to the invention the polymer particles are added as dry powder that may have a maximum particle size in the range 10 $\mu$m to 3 mm. The particle size preferably is about 50 $\mu$m. Preferably it is below 500 $\mu$m, most preferably below 200 $\mu$m. The particles may have a spread of sizes, but preferably the particles are substantially free of fines (.e.g, particles having a size below 20 $\mu$m).

In another process according to the invention a substantially proportion of the swollen polymer particles have a size greater than the size of most or all of the coal fines and the swollen polymer particles are then separated from the dry coal fines. For instance in one process according to the invention at least 50% (dry weight) of the swollen polymer particles have a size greater than the size of at least 95% of the substantially dry coal fines and these oversize swollen particles are separated from the dry coal fines. Preferably the polymer particles swell to at least twice their dry diameter and substantially all the said swollen polymer particles have a size greater than the size of substantially all the dry coal fines and the polymer particles are separated from the dry coal fines. The separation may be by conventional size classification or weight classification techniques, preferably by seiving using a vibrating sieve.

The dry coal fines are preferably used as fuel and as a result of having separated the polymer from the fines the water content of the polymer is not carried in to the fuel and the separated swollen particles can, if desired, be dried (e.g., by heat exchange from the fuel burner) and can be recycled for further use. For instance the polymer particles preferably swell to at least twice their initial dry diameter and at least 95% of the coal fines have a diameter which is below 50%, and preferably below 25%, of the swollen diameter of the polymer particles. For instance if the coal fines have a size of, say, 100 $\mu$m polymer particles having a size of at least 50 $\mu$m will generally swell sufficient to allow separation from the coal particles.

The swellable polymer particles may be mixed with the wet coal fines without any prior addition of any material to the coal fines. However improved results can be achieved if the coal fines that are mixed with the swellable polymer particles have previously been treated with a co-ionic dispersing agent, a counter-ionic coagulant, or a flocculant. For instance the wet filter cake may be blended with a solution of the dispersing agent, coagulant or flocculant so as to promote liberation of bound water from the cake, before adding the absorbent polymer particles. In some instances it can be desirable to include the dissolved agent with the coal fines at the time of a filtration stage, e.g., for producing the wet filter cake. For instance a slurry or froth concentrate of the coal fines can be treated by a coagulant or a flocculant or a combination (usually a coagulant followed by a flocculant) prior to filtration to provide the wet filter cake.

In some instances it is desirable to add the dissolved agent after the absorbent polymer, so as to modify the texture of the substantially dry coal fines that are generated by the process of the invention.

The amount of dissolved agent that is required for optimum results can easily be found by routine experimentation and will depend upon whether the agent is intended to act as a dispersing agent, a coagulant or a flocculant. For instance if the agent is being added as a dispersing agent but is intended to improve the fluidity of a wet filter cake, then increasing the amount of the agent will increase fluidity until fluidity becomes substantially constant, whereafter further addition of dispersing agent is unnecessary. Similarly, routine experimentation can be used to optimise the amount of coagulant and/or flocculant.

The wet filter cake or other wet mass of coal fines is generally anionic and generally has a low negative zeta potential, with the result that the dispersing agent should then be an anionic dispersing agent and a relatively small amount of anionic dispersing agent will be sufficient to bring the coal fines to a substantially constant zeta potential. When the filter cake is anionic the coagulant must be cationic, and a larger amount of this will be necessary to bring the filter cake to a substantially constant zeta potential.

When a flocculant is used it may be non-ionic, co-ionic or counter-ionic to the coal fines, the selection being made in known manner having regard to conventional considerations, such as whether or not a coagulant or dispersing agent has been used.

Co-ionic dispersing agent is generally a polymer of low molecular weight, usually below 500,000, generally below 200,000 and often below 50,000. For many processes molecular weights of below 10,000, e.g., 2,000 to 5,000, are satisfactory. The dispersing agent is usually anionic.

The counter-ionic coagulant generally has a molecular weight of above 50,000, often in the range 100,000 to 1 million, typically about 500,000. However it can have a higher molecular weight. The flocculant can have molecular weight below 1 million but generally it is above. It can be several million, and can be of typical flocculant molecular weight. Although the polymeric agents are usually substantially linear and in true solution, it can be particularly advantageous, when the agent is a higher molecular weight agent such as a flocculant, for it to be in the form of very small particles at the time it is mixed with the wet coal fines, preferably being a slightly cross linked polymer, as describes in EP 0202780.

The added agents are usually synthetic polymers formed from water soluble ethylenically unsaturated monomers, and these monomers will be chosen to give the polymer the desired ionic characteristic. Generally the agents are formed wholly from ionic monomers or from blends of ionic monomers with acrylamide or other non-ionic monomers, such as (meth) acrylic esters.

The anionic monomer is preferably acrylic acid but can be any other suitable ethylenically unsaturated monocarboxylic acid or sulphonic acid. It can include or consist of 2-acrylamido-2-methyl propane sulphonic acid. The anionic monomer is generally present as a water soluble salt, generally the sodium salt.

Suitable cationic monomers include diallyl dimethyl ammonium chloride and dialkyl amino alkyl (meth) -acrylates or -acrylamides, generally as acid addition or quaternary ammonium salts. For instance the cationic dispersing agent is preferably a low molecular weight polymer of diallyl dimethyl ammonium chloride or dimethyl amino ethyl (meth) acrylate, or a blend of either of these with acrylamide.

Although in most processes satisfactory and cost-effective results can be achieved when the absorbent polymer is anionic, it is sometimes desirable for the polymer to be counter-ionic to the zeta potential of the wet filter cake. Thus if the filter cake has a negative zeta potential it can be desirable to use a cationic absorbent polymer, and if the cake has a positive zeta potential it can be preferred to use an anionic absorbent polymer.

The zeta potential can be increased or reduced, prior to adding the counter-ionic absorbent polymer, in any desired manner, for instance by adding a dissolved polymeric agent as discussed above.

Instead of using dissolved polymer agents in the invention, any other material that has the desired effect on the fluidity and/or zeta potential of the filter cake can be used.

When a dispersant or coagulant or other material is being incorporated before the absorbent polymer, it is generally applied as a solution but can be applied in solid form if its solubility is such as to permit it to dissolve relatively rapidly within the wet filter cake.

It is often preferred that the particle sizes and the amounts of the absorbent polymer and of the filter cake are such that the number ratio of polymer particls:filter cake particles is approximately 1, e.g., from 3:1 to 1:3. For instance this is achieved by adding about 0.2% (dry on dry) of polymer particles having a particle size of about 20 to 30 μm to filter cake having a particle size of about 100 μm. Larger amounts of these polymer particles are appropriate when the filter cake has a significant electrolyte content.

The amount of polymer that is applied is generally at least 0.005% and is preferably at least 0.05%. It is usually below 5%, preferably below 1% and most preferably is around 0.05 to 0.5%. It is a particular advantage of the invention that, despite the unpleasant character of the wet mass, good results can be obtained with very low amounts of polymer, often below 0.3% or 0.4% and often below 0.15% or 0.2%. These amounts are of dry polymer based on dry particles by weight.

The polymer may be added to the filter cake in any convenient manner, for instance by spraying a dispersion of particles or by dusting powder, and must be mixed uniformly into the wet particulate mass. Preferably mixing is by means of a rotating mixing blade or by other mixer that provides adequate shear. Preferably the mixing is by a double scroll mixer or other screw mixer/conveyor. It can be by a plough share mixer.

The water content of the wet particulate mass is generally at least 15% but is usually below 50%. Often it is in the range 20 to 40%, usually around 25 to 30 or 35% by weight.

The wet particulate mass is preferably a wet filter cake of coal fines, for instance the sticky mass that results from vacuum filtration by a disc, drum or other vacuum filter of a slurry or froth flotation concentrate of coal fines, typically having a particle size below 2 mm and usually below 1 mm, e.g., up to about 0.5 mm. Often the particle size is mainly in range 50 to 300 μm, often 50 to 150 μm. The cake can be taken direct from the filter or it can be stored for prolonged periods, e.g., as a wet coal fine dump, before treatment in the invention.

The resultant mass is crumbly, as opposed to the sticky and pasty texture before treatment, and can easily be mixed with coal smalls to form a useful fuel. Whereas 10% coal fines is often the maximum that can be incorporated by traditional techniques, in the invention the amount of coal fines can be increased considerably, e.g., to 20% or more. Typically the crumbly dry coal fines are used as an industrial fuel, e.g., in an electricity generating station. Often they are subjected to various treatments, such as blending, pelleting and/or grinding, before being burnt.

The invention is applicable to other wet particulate masses, especially those where the particulate material is of similar size, and is environmentally important (e.g., toxic or semi-liquid industrial waste) or economically important (e.g., carbon black or metallurgical suspensions such as red mud or copper concentrates). The particulate material can be hydrophilic but is preferably hydrophobic.

The invention provides an easy manner of converting a potentially unusable pasty or sticky wet particulate mass to a friable solid that can easily be handled and used in a commercially useful manner.

The following are some examples.

EXAMPLE 1

Sodium polyacrylate cross linked with 0.025% methylene bis acrylamide was formed by conventional bulk gel polymerisation and was dried and comminuted in conventional manner. The resultant particles were classified according to size and the fines were retained for use in the invention. They had a dry particle size below 50 μm, mainly in the range 10 to 30 μm.

The fines were dispersed into an equal weight of a hydrocarbon oil that was thickened with a dispersion stabiliser as described at page 18 lines 25 to 35 of EP 0161926A. 1% oil-in-water emulsifier was included.

The dispersion was sprayed on to a wet filter cake of coal fines, this filter cake having been taken from a vacuum filter following froth flotation. The amount of dispersion was 0.1% dry polymer on dry particulate mass. The product was mixed thoroughly and rapidly became a friable, crumbly solid. This could easily be blended with coal smalls to form a fuel. Without the addition of the dispersion, the filter cake was a wet sticky mass that could not easily be used.

In a comparison, when a similar amount of dry polymer particles of the same polymer but having a size of around 100 μm, and that were not dispersed in oil, was added to the cake, the cake did not become so crumbly so quickly. With prolonged mixing and larger amounts of polymer (.e.g, 0.2% or even 0.5%) the product was adequately crumbly but swollen polymer particles and aggregates were apparent.

In the following examples values named as the "shear dissociation time" and the "dissociation time" are recorded as an indication of the effect of the process.

The "dissociation time" was recorded by putting 600 g of a wet, pasty, coal filter cake (water content 25–30%, particle size up to 0.5 mm) in a Hobart mixer bowl, adding the dispersion of water absorbent polymer, and stirring at speed 2 until the product became sufficiently friable that aggregates started being thrown out of the bowl. The time taken for this stage to be reached is the dissociation time. In a typical process, using 600 grams of a filter cake having a maximum particle size below 0.5 mm and containing 20 to 30% water and 10 to 15% ash, a dissociation time of up to around 30 seconds is often suitable.

After stirring for a further 2 minutes at speed 1, the resultant mix is left for a selected time in a sealed bag. The time is 30 minutes, except in Example 9, when it is 5 minutes. 100 grams of the mix is put into a cylinder 65 mm in diameter and pressed into this cylinder to a disc under pressure of 0.38 kg/cm$^2$ (5.5 psi) to give a cake. The cake is placed on a cut away test plate and a solid plate is lowered at a constant rate on to the top of the cake and is pressed down on to it. The time is measured between the plate touching the top of the cake and the cake shattering over the cut away part of the test plate. This is the shear dissociation time (SDT). If the plate shatters immediately upon contact with the lowering plate, the shear dissociation time is recorded as zero. The lower the value, the more friable the cake.

EXAMPLE 2

Three types of dispersion, each containing equal amounts of polymer and hydrocarbon oil (kerosene or diesel), and oil-in-water emulsifier, were made as follows.

Suspensions—by the general technique of Example 1 using particles of the size shown RP Emulsions—by the reverse phase polymerisation to give a product of about 35% oil, 35% polymer, 30% water RP Dispersions—by azeotroping RP Emulsions to about 50% polymer 50% oil The compositions wre tested at 0.5% product on wet coal filter cake as above. The monomers used and the results are in the following table, where NaAc=% sodium acrylate, ACM=% acrylamide and MBA=-methylene bis acrylamide (ppm).

| Composition | NaAc | ACM | MBA | Dissociation (secs) | SDT (secs) |
|---|---|---|---|---|---|
| Ex 1 | 100 | 0 | 200 | 18 | 7 |
| 355–500 μm Suspension | 50 | 50 | 200 | 82 | 0 |
| 65–180 μm Suspension | 50 | 50 | 200 | 28 | 0 |
| <65 μm Suspension | 50 | 50 | 200 | 14 | 0 |
| RP Dispersion | 50 | 50 | 100 | 50 | 0 |
| RP Dispersion | 50 | 50 | 200 | 37 | 0 |
| RP Dispersion | 50 | 50 | 300 | 75 | 0 |
| RP Dispersion | 25 | 75 | 25 | 30 | +30 |
| RP Dispersion | 25 | 75 | 50 | 42 | 11 |
| RP Dispersion | 25 | 75 | 100 | 32 | 0 |
| RP Dispersion | 25 | 75 | 200 | 40 | 0 |
| RP Emulsion | 100 | 0 | 100 | 31 | 4.2 |
| RP Dispersion | 100 | 0 | 100 | 25 | 14 |

EXAMPLE 3

Tests similar to Example 2 were conducted on RP dispersions of 50% oil and 50% of a copolymer of 50% NaAc 50% ACM 200 ppm MBA with or without added oil-in-water emulsifier, at different amounts of polymer.

| Dispersion Amount | Emulsifier | Dissociation | SDT |
|---|---|---|---|
| 0.5% | 0 | 16 | 0 |
| 0.2% | 0 | 25 | 1.8 |
| 0.5% | 3% | 23 | 0 |
| 0.2% | 3% | 37 | 2.2 |

The disadvantage of incorporating emulsifier is apparent.

EXAMPLE 4

Tests similar to Example 2 were conducted on a 50% RP dispersion of a copolymer of 50% NaAc 50% ACM 200 ppm MBA (product A) and the same product after dilution to 25% polymer by red diesel oil (B).

| Dispersion Amount | Polymer Concentration | Dissociation | SDT |
|---|---|---|---|
| 0.5% A | 50% | 19.4 | 2.6 |
| 0.3% A | 50% | 30.1 | 11.0 |
| 1.0% B | 25% | 14.8 | 2.3 |
| 0.6% B | 25% | 22.3 | 7.9 |

The benefit of reducing the polymer concentration is apparent.

EXAMPLE 5

A RP dispersion was formed of 50% oil 50% copolymer of 50% NaAc 50% ACM 200 ppm MBA. This was diluted with various amounts of water and the products were tested on wet coal filter cake as in Example 2 at different dosages of product.

| Product Amount | Polymer % | Water % | Oil % | Dissociation | SDT |
|---|---|---|---|---|---|
| 0.5% | 50 | 0 | 50 | 19 | 3.4 |
| 0.2% | 50 | 0 | 50 | 31 | 30 |
| 0.56% | 45 | 10 | 45 | 31 | 4.8 |
| 0.22% | 45 | 10 | 45 | 34.6 | 10.6 |
| 0.63% | 40 | 20 | 40 | 24.9 | 3.8 |
| 0.25% | 40 | 20 | 40 | 31.8 | 8.9 |
| 0.71% | 35 | 30 | 35 | 24.1 | 2.4 |
| 0.29% | 35 | 30 | 35 | 29.9 | 14.4 |
| 0.83% | 30 | 40 | 30 | 22.5 | 2.9 |
| 0.33% | 30 | 40 | 30 | 26.8 | +30 |
| 1.0% | 25 | 50 | 25 | 22.6 | 3.9 |
| 0.4% | 25 | 50 | 25 | 29.7 | +30 |

This clearly shows that the addition of a controlled amount of water gives improved results at low dosages and thus provides a particularly cost effective system.

EXAMPLE 6

Example 2 was repeated using similar amounts of three different polymer suspensions. ACN is acrylonitrile.

Tests 5, 6 and 7 were conducted with different starch acrylonitrile copolymers dispersions. Tests 8–10 were with 60% dispersions in oil and tests 11 to 13 were with 50% dispersions in oil. Test 14 was with 1% of a 25% emulsion of aqueous polymer particles in oil and test 15 with a 50% dry dispersion of similar, but dry, polymer particles.

| Test | Polymer | ppm MBA | Amount | Dissociation | SDT |
|---|---|---|---|---|---|
| 1 | 100 NaAc | 200 | 0.5% | 18 | 4.6 |
| 2 | Superabsorbent Starch | — | 0.25% | 22.3 | 8.3 |
| 3 | 30 Starch 70 ACN | — | 0.25% | +120 | +30 |
| 4 | 30 Starch 70 ACN | — | 0.75% | 33.5 | 3 |
| 5 | 15 Starch 85 ACN | — | 0.4% | 20.9 | 4.2 |
| 6 | 15 Starch 85 ACN | — | 0.4% | 83.7 | 0.0 |
| 7 | 15 Starch 85 ACN | — | 0.4% | 23.3 | 30 |
| 8 | 25 NaAc 75 ACM | 100 | 0.4% | 20.3 | 3.4 |
| 9 | 20 NaAc 80 ACM | 100 | 0.4% | 25.6 | 2.6 |
| 10 | 10 NaAc 90 ACM | 100 | 0.4% | 29.8 | 2.4 |
| 11 | 50 NaAc 50 ACM | 200 | 0.5% | 37.6 | 0 |
| 12 | 25 NaAc 75 ACM | 200 | 0.5% | 40.5 | 0 |
| 13 | 100 ACM | 200 | 0.5% | 39.4 | +30 |
| 14 | 50 NaAc 50 ACM | 100 | 1% | 23.0 | 3.9 |
| 15 | 50 NaAc 50 ACM | 100 | 0.5% | 22.4 | 2.9 |

EXAMPLE 7

Cross linked sodium polyacrylate is made by gel polymerisation of acrylic acid with about 300 ppm methylene bis acrylamide followed by drying and comminution and reaction, before the gel particles are fully dry, with aluminium isopropoxide followed by further drying. The resultant particles have a size around 100 $\mu$m and a gel capacity of about 600.

Wet lump coal, having a size generally in the range 1 to 5 cm, and contaminated with up to 80% water is mixed with 0.1% of the cross linked polyacrylate particles. When transported in wagons, the treated coal is easily tipped out of the wagons as independent particles, but the untreated coal tended to solidfy in the base of the wagons.

The same result is achieved when the wet coal has a much smaller particle size, typically about 0.5 mm.

EXAMPLE 8

A cross linked polymer is formed by gel copolymerisation of 60% by weight acrylamide, 40% by weight sodium acrylate and 0.025% by weight methylene bis acrylamide, followed by drying and comminuting to a particle size range of 75 to 500 $\mu$m. The dry particles have a gel capacity of about 400.

0.3% of the cross linked polymer particles are mixed into a slurry of filter coal tailings having a particle size of up to about 1 mm and containing about 35% water. The product is converted from a sticky unpleasant mass to a relatively dry powder that can easily be transported on a conveyor or pneumatically.

A friable product can also be obtained by mixing the same amount of the same polymer particles into a wet filter cake of coal fines having a particle size mainly below 300 $\mu$m and the product can be used as a feed for fuel to a power station.

EXAMPLE 9

The process of example 8 can be repeated with a filter cake of wet coal fines having a particle size of about 100 $\mu$m. After the polymer has been mixed thoroughly into the wet filter cake and that cake has been converted to a dry friable mass, the mixture can be sieved through a vibrating sieve having a mesh size of above 500 $\mu$m, thereby retaining the swollen polymer particles and allowing the coal fines to pass through the mesh. The swollen polymer particles can be dried (for instance using heat generated by burning some of the dried fines) and can be re-used.

EXAMPLE 10

An aqueous solution of cationic polymer is stirred into a wet filter cake of coal fines. After stirring for one minute, 50% dispersion in oil of cross linked gel polymer particles of acrylamide and sodium acrylate polymer is blended into the filter cake. The dissociation time and the 5 minutes shear dissociation time are recorded. In every instance the 20 minute shear dissociation time was above 30. The results are as follows, in which polymer A is a low molecular weight diallyl dimethyl ammonium chloride coagulant, polymer B is a high molecular weight, slightly cross linked, copolymer of 58 mole percent acrylamide and 42 mole percent cationic dialkylaminoalkyl acrylate quaternary monomer, and polymer C is a homopolymer of a cationic dialkylaminoalkyl methacrylate quaternary monomer. In addition to the results shown in the table below, the product was assessed visually and it was significant that increasing amounts of product B, and especially the tests with product C, gave the best visual appearance.

| % Cationic Polymer | % Dispersion | Dissociation | SDT |
| --- | --- | --- | --- |
| — | 0.5 | 18.4 | 6.7 |
| 0.05 A | 0.5 | 19.6 | 3.1 |
| 0.15 A | 0.5 | 17.5 | 3.6 |
| — | 1.0 | 17.5 | 2.6 |
| 0.15 A | 1.0 | 16.9 | 0 |
| 0.3 A | 1.0 | 15.2 | 1.9 |
| — | 1.0 | 17.5 | 2.6 |
| 0.08 B | 1.0 | 12.1 | 2.0 |
| 0.16 B | 1.0 | 10.9 | 0 |
| — | 1.0 | 17.5 | 2.6 |
| 0.4 C | 1.0 | 8.7 | 0 |
| 0.8 C | 1.0 | 8.6 | 0 |

We claim:

1. A process comprising mixing a sticky mass of coal fines and water with polymer particles that are non-film forming and non-sticky when wet by the water in the sticky mass and that are a water absorbing polymer, and thereby forming a crumbly mixture of substantially dry coal fines and substantially non-sticky swollen polymer particles, wherein said water absorbing polymer is swellable but insoluble in water, said water absorbing polymer formed from a water soluble monoethylenically unsaturated monomer or monomer blend in the presence of a crosslinking agent.

2. A process according to claim 1 in which the said polymer particles are added as a dry powder and have a dry particle size of from 50 μm to 500 μm.

3. A process according to claim 1 in which the swollen polymer particles have a size greater than the size of most of the coal fines and the swollen polymer particles are separated from the dry coal fines.

4. A process according to claim 1 in which the polymer particles are added to the wet sticky mass of coal fines while the polymer particles are in the form of a dispersion in water immiscible liquid.

5. A process according to claim 1 in which polymer particles have a size at least 90% below 50 μm and are added to the wet sticky mass of coal fines while present as a dispersion in water-immiscible liquid.

6. A process according to claim 1 in which the polymer particles have a size below 10 μm and are added to the wet sticky mass of coal fines while present as a dispersion in water-immiscible liquid wherein the polymer particles in the dispersion contain at least 30% by weight water, based on the dry weight of polymer.

7. A process according to claim 1 in which the polymer particles are added to the wet sticky mass of coal fines while present as a dispersion made by reverse phase polymerisation and comprising 25 to 45% by weight of the said polymer particles, 25 to 45% by weight water and 25 to 45% by weight water-immiscible liquid in which the polymer and water are dispersed, the polymer particles having a dry size of below 10 μm.

8. A process according to claim 1 in which the wet sticky mass of coal fines are mixed with a flocculant or with a counter-ionic coagulant before addition of the water absorbing polymer.

9. A process according to claim 1 in which the wet sticky mass of coal fines is a filter cake and a flocculant or counter-ionic coagulant is mixed with the cake before addition of the polymer.

10. A process according to claim 1 in which the wet sticky mass of coal fines is a filter cake formed by coagulating a slurry or concentrate by addition of a coagulant and then filtering the coagulated product.

11. A process according to claim 10 in which sufficient dissolved co-ionic dispersing agent is incorporated into the filter cake to increase the fluidity of the filter cake and liberate bound water from the particles, and the absorbent polymer particles are thereafter added.

12. A process according to claim 1 in which the absorbent polymer is a polymer of 5 to 100 mole % acrylic acid as free acid or water soluble salt, 0 to 95 mole % acrylamide, 0 to 50 mole % other monoethylenically unsaturated monomers and 50 to 500 ppm cross linking agent.

13. A process according to claim 1 in which the wet sticky mass of coal fines is a filter cake of coal fines.

14. A process according to claim 1 in which the polymer particles are added to the wet sticky mass of coal fines while the polymer particles are in the form of a dispersion in water immiscible liquid and the addition is conducted in the absence of oil-in-water emulsifier.

15. A process according to claim 1 in which the crosslinking agent is selected from diethylenically unsaturated monomers and polyethylenically unsaturated monomers.

16. A process according to claim 1 wherein the water absorbing polymer is formed from monomers selected from the class consisting of
    anionic monomers selected from the group consisting of methacrylic acid, acrylic acid, allyl sulfonate, 2-acrylamido methyl propane sulfonic acid, and water soluble salts thereof,
    non-ionic monomers selected from the group consisting of methacrylamide, acrylamide, methacrylic esters and acrylic esters, and
    cationic monomers selected from the group consisting of dialkylaminoalkyl acrylates, dialkylaminoalkyl methacrylates, dialkylaminoalkyl acrylamides, dialkylaminoalkyl methacrylamides, acid salts thereof and quaternary salts thereof.

17. A process comprising mixing a wet sticky mass of inorganic particles with polymer particles that are non-film forming and non-sticky when wetted by the mass and that are water absorbent, thereby forming a crumbly mixture of substantially dry inorganic particles and substantially non-sticky swollen polymer particles.

* * * * *